(12) United States Patent
Epps et al.

(10) Patent No.: US 6,447,832 B1
(45) Date of Patent: Sep. 10, 2002

(54) COCONUT CONCENTRATE DEFLAVORING PROCESS

(75) Inventors: Jackie Epps, Collierville; Mathilda Doorley, Bartlett, both of TN (US)

(73) Assignee: Kraft Foods Holdings, Inc., Northfield, IL (US)

( * ) Notice: Subject to any disclaimer, the term of this patent is extended or adjusted under 35 U.S.C. 154(b) by 1 days.

(21) Appl. No.: 09/679,485

(22) Filed: Oct. 4, 2000

(51) Int. Cl.[7] .......................... A23L 1/212; A23L 1/221
(52) U.S. Cl. ...................... 426/617; 426/486; 426/487; 426/488; 426/601
(58) Field of Search .................. 426/617, 601, 426/486, 487, 488

(56) References Cited

U.S. PATENT DOCUMENTS 2,422,893 A * 6/1947 Forkner et al. ............. 426/617
5,091,116 A 2/1992 Epps et al. .................. 260/409
5,599,575 A 2/1997 Loh et al. .................... 426/617

* cited by examiner

*Primary Examiner*—Helen Pratt
(74) *Attorney, Agent, or Firm*—Fitch, Even, Tabin & Flannery

(57) ABSTRACT

A process effective for providing a deflavored coconut concentrate is provided. More specifically, a coconut concentrate is processed to separate coconut oil from coconut concentrate fibrous material. The separated oil is deodorized and blended back with the coconut concentrate fibrous material to extract further flavorings from the coconut concentrate fibrous material. The separation and reblending steps are repeated until the desired degree of deflavoring has been obtained at which point the fibrous material and the final deflavored oil are blended together to form the deflavored coconut concentrate. The present process allows the production of deflavored coconut concentrate without adversely affecting the color and functionality, including the texture enhancing ability, of the coconut concentrate.

14 Claims, 1 Drawing Sheet

COCONUT CONCENTRATE DEFLAVORING PROCESS

The present invention relates to a process that is effective for providing a deflavored coconut concentrate. More specifically, a coconut concentrate is processed to separate coconut oil from coconut concentrate fibrous material. The separated oil is deodorized and blended back with the coconut concentrate fibrous material to extract further flavorings from the coconut concentrate fibrous material. The separation and reblending steps are repeated until the desired degree of deflavoring has been obtained at which point the final deflavored oil (or a portion thereof) is added back to fibrous material to provide the deflavored coconut concentrate.

BACKGROUND

Coconut concentrates can be blended with a wide variety of foods to provide texture enhancement. Unfortunately, the associated coconut flavor may not be desired in all applications. Coconut flavor may be removed using oil deodorization processes since a preponderance of the flavor is contained in the oil. Conventional industrial deodorization processes involve high heat and shear stress which affect coconut concentrate color and functionality via protein denaturation and browning reactions. Coconut concentrates produced in this manner are not generally acceptable as texture enhancers in many types of foods. It would be desirable, therefore, to provide deflavored coconut concentrates with reduced coconut flavor without undesirable color changes of loss of functionality. The present invention provides such coconut concentrates and methods for producing such coconut concentrates.

SUMMARY

The present invention is directed to a method for providing a deflavored coconut concentrate. The deflavored coconut concentrate provided by the process of the invention has the color and functionality of coconut concentrate that has not been deodorized, but does not have the coconut flavor associated with a coconut concentrate. In the present invention, separating the oil from the fibers prior to deodorization exposes only the oil to high temperature allowing the fibers to maintain their native form.

In an important aspect, the process of the invention is effective for providing a deflavored coconut concentrate where flavor components responsible for coconut flavor have been reduced by at least about 25 percent, and the deflavored protein concentrate has a protein concentration of at least about 6 percent with essentially none of the protein being denatured (i.e., less than about 1 percent denatured). The resulting deflavored coconut concentrate may be used as a texture enhancer in a wide range of applications where coconut flavor is not desired.

In accordance with the present invention, a coconut concentrate is provided that includes at least about 6 percent protein, at least about 20 percent fibrous carbohydrates, at least about 2 percent water, and at least about 60 percent oil, based on the total weight of the coconut concentrate composition. More preferably, the coconut concentrate includes about 6 to about 8 percent protein, about 20 to about 30 percent fibrous carbohydrates, about 2 to about 4 percent water, and about 60 to about 70 percent oil, based on the total weight of the coconut concentrate composition. The coconut concentrate is first subjected to a separation process effective for separating at least about 75 percent of the oil, and preferably at least 90 percent of the oil from the coconut concentrate fibrous matrix material. Preferably, the separation is carried out using a centrifugation process, and more preferably, a high-speed centrifugation process.

Coconut oil separated from the coconut concentrate fibrous matrix is subjected to conventional deodorization processes to form a deodorized oil. The deodorized oil is then added back and blended with the coconut concentrate fibrous matrix material to allow additional coconut flavor to partition into the oil. The oil is once again separated from the coconut concentrate fibrous matrix. This process is repeated until the desired degree of flavor removal from the concentrate fibrous matrix is obtained. Once the final degree of flavor removal has been achieved, the fibrous matrix is combined with at least a portion of the final deflavored oil as the deflavored coconut concentrate. Thus, the deflavored coconut concentrate contains the fibrous matrix and at least a portion, and more preferably essentially all, of the deflavored oil.

The process of the present invention is effective for significantly reducing the concentration of coconut flavor components in the coconut concentrate as compared to the original starting material. By repeatedly extracting flavor in the fibrous matrix using the deodorized oil, a deflavored coconut concentrate can be obtained which can then be used in a wide variety of food compositions. The desired degree of flavor removal will depend, of course, on the intended application or food product.

DETAILED DESCRIPTION

Figure 1:
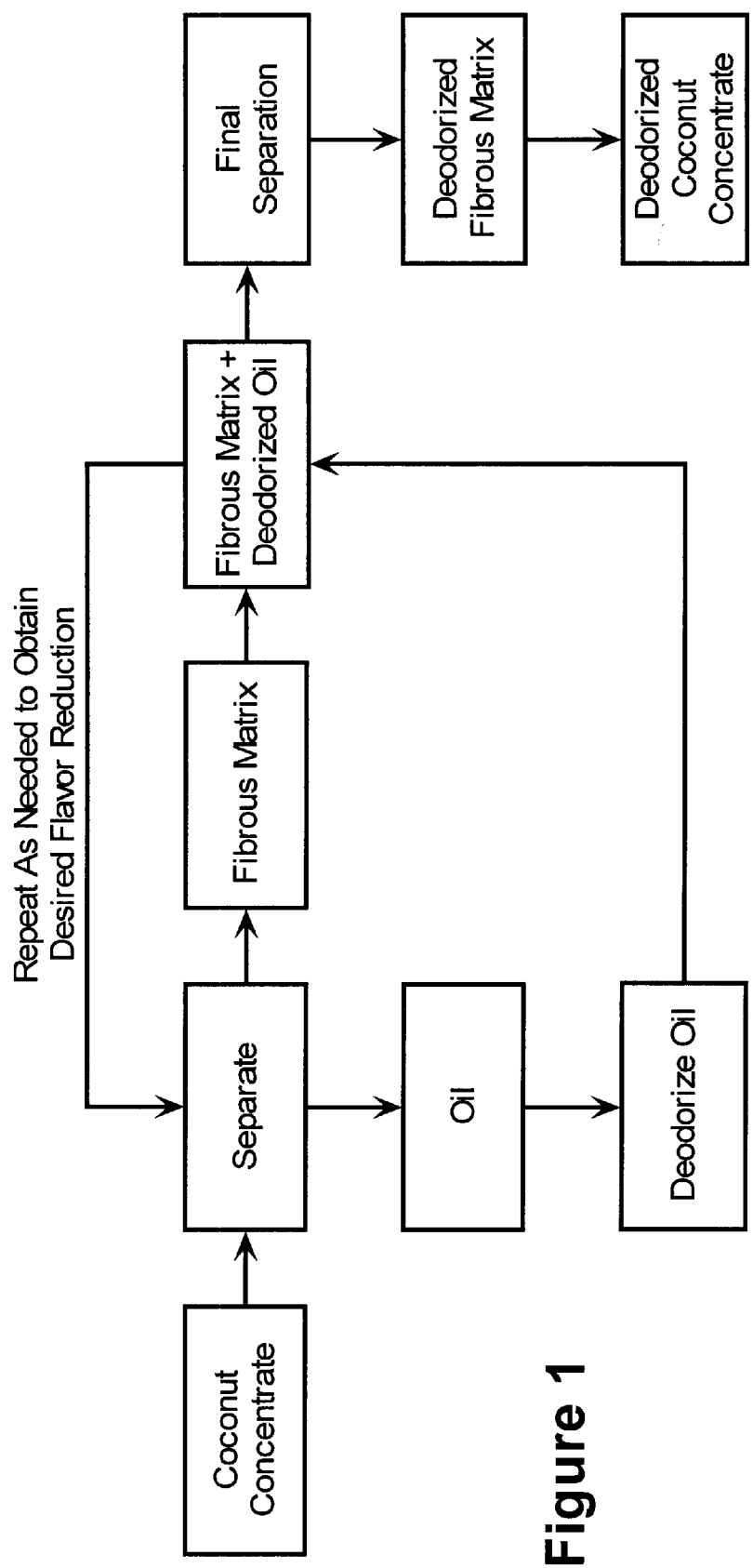
FIG. 1 generally illustrates the process of the invention.

The present invention is effective for providing a deflavored coconut concentrate. The deflavored coconut concentrate can be used as a texture enhancer in a number of applications because the process of the invention does not result in browning or denaturation of proteins present in the coconut concentrate.

As illustrated in FIG. 1 and further described below, a coconut concentrate is subjected to a separation process. Oil that is separated from the coconut concentrate is deodorized and then added back to coconut concentrate fibrous material. This process may be repeated as many times as necessary to form a deflavored coconut concentrate with the desired degree of flavor removal. The deflavored coconut concentrate is obtained by adding the final deodorized oil (or at least a portion thereof) to the coconut concentrate fibrous material.

Deflavored Coconut Concentrate. As used herein, a "deflavored coconut concentrate" refers to a composition where major flavor components responsible for coconut flavor have been reduced sufficiently to allow the deflavored coconut concentrate to be incorporated into a food product in a texture enhancing amount without imparting objectionable flavor characteristics to the food product. Generally, flavor reductions of about 25 percent or more, as compared to the starting coconut concentrate material, are sufficient. The deflavored coconut concentrate has a protein concentration of at least about 6 percent with essentially none of the protein being denatured (i.e., less than about 1 percent denatured). The deflavored coconut concentrate generally contains at least about 6 percent protein, at least about 20 percent fibrous carbohydrates, at least about 2 percent water, and at least about 60 percent oil, based on the total weight of the coconut concentrate composition. More preferably, the coconut concentrate includes about 6 to about 8 percent protein, about 20 to about 30 percent fibrous carbohydrates, about 2 to about 4 percent water, and about 60 to about 70 percent oil, based on the total weight of the coconut concentrate composition. In an important aspect of the invention, the deflavored coconut concentrate has a similar color to the a non-deflavored coconut concentrate. More specifically, the major flavor components responsible for coconut flavor include ethyl octanote, delta octalactone, ethyl decanoate, and delta decalactone.

Coconut Concentrate. As used herein, the starting "coconut concentrate" refers to a composition that contains about 6 to about 8 percent protein, about 20 to about 28 percent fibrous carbohydrates, about 60 to about 70 percent oil, and about 2 to about 4 percent water, based on the total weight of the coconut concentrate composition. The coconut concentrate can be obtained from, for example, creamed coconut products or desiccated coconut (generally 3 percent or less moisture). One especially preferred coconut concentrate is provided in U.S. Pat. No. 5,599,575 (Feb. 4, 1997), which is hereby incorporated by reference. Preferably the coconut concentrate has an average particle size of about an average particle size of about 1 to about 20 microns.

Separation of Oil. In this aspect of the invention, a coconut concentrate is subjected to a separation process effective for separating at least about 60 percent, and preferably at least 90 percent, of the oil from a coconut concentrate fibrous matrix material. As used herein a "coconut concentrate fibrous matrix" refers to a coconut concentrate that has had at least about 60 percent of its starting oil removed, and preferably at least about 90 percent of its starting oil removed.

Oil may be separated from the coconut concentrate fibrous matrix by any method effective for separating oil from the fibrous matrix. Such methods include, for example centrifugation, pressing, solvent extraction, and the like. Preferably, a low heat and low shear separation process is preferred. In an important aspect of the invention, the oil is separated from the fibrous matrix by high speed centrifugation. Preferably, high speed centrifugation is carried out a about 2000 G or higher and a temperature of about 90 to about 100° F.

Deodorization of Oil. In this aspect of the invention, oil separated from the coconut concentrate fibrous matrix is subjected to a conventional deodorization process. Examples of processes for the deodorization of edible oils include U.S. Pat. No. 5,091,116 which is hereby incorporated by reference. According to conventional processes, edible oils are refined by alkali treatment, bleached, and subjected to a deodorization treatment by means of steam injection into a hot oil mass under substantial vacuum. Conventional vacuum-steam deodorization processes utilize volatility differences between the vegetable oil triglycerides and the undesired flavor components to strip the relatively more volatile flavor components from the relatively less volatile triglycerides. Vacuum-steam deodorization treatment also decomposes peroxides in the oils and removes the other volatile products which may result from such decomposition. Energy saving modifications of this process may also be utilized.

Blending of Deodorized Oil. In another aspect of the invention, the deodorized coconut oil is blended with the separated coconut concentrate fibrous matrix. In important aspect, at least about 50 percent of the coconut oil is blended with the coconut concentrate fibrous matrix, preferably at least about 80 percent, and most preferably essentially all, of the coconut oil is blended with the coconut concentrate fibrous matrix. Blending may be accomplished using standard blending techniques and is generally conducted at ambient temperatures or higher, and preferably at a temperature of from about 85 to about 105° F. Blending of deodorized oil with coconut concentrate fibrous matrix should be conducted at a relatively low shear rate so that the texture of the resulting coconut concentrate is not significantly modified. Preferably, the shear rate is less than about 10 sec$^{-1}$.

In an important aspect of the invention, the deflavored coconut oil and fibrous matrix blend is allowed to stand for time effective for allowing flavors remaining in the coconut concentrate fibrous matrix to partition into the oil. Partitioning may be complete immediately after blending or the blend may be allowed to stand for about 30 to about 90 minutes. Gentle mixing can be used to increase the rate of partitioning of flavors into the oil phase. After partitioning, the oil is removed or separated from the fibrous matrix in accordance with one of the separation techniques described above.

Further Blending With Deodorized Oil. In an important aspect of the invention, the coconut concentrate is preferably subjected to centrifugation at least once, and more preferably at least twice, such that sufficient flavors are removed so that the concentrate is considered a deflavored coconut concentrate and is effective for use as a texture enhancer in other foods. In another aspect of the invention, the coconut concentrate may be blended with deodorized oil a second time to further effect deflavoring. In an important aspect of the invention, the coconut concentrate is subjected to centrifugation at least twice, and in a very important aspect at least three times. In certain applications, the coconut concentrate may be subjected to centrifugation more than three times. The desired degree of flavor removal will, of course, depend on the food composition in which the concentrate is to be used and can be determined by those skilled in the art of food technology.

The final deflavored coconut concentrate preferably contains at least about 60 percent oil. Preferably the major flavor component concentrations in the deflavored coconut concentrate have been reduced by at least about 25 percent, as compared to the starting coconut concentrate. Preferably, the deflavored coconut concentrate has a protein concentration of at least about 6 percent with essentially none of the protein being denatured (i.e., less than about 1 percent denatured). Examples of the major flavor components, as well as the reductions obtained after two or three separations, are shown in Example 1 below.

The following example illustrates a method for carrying out the invention and should be understood to be illustrative of, but not limiting upon, the scope of the invention which is defined in the appended claims. Unless otherwise indicated, all percentages are by weight.

EXAMPLE 1

Flavor Reduction of Coconut Concentrate

A coconut concentrate was centrifuged using a Beckman (Model LE 80K) centrifuge at about 15,000 rpm for about 15 minutes and a constant temperature of about 100° F. After centrifugation, there was a distinct layer of separated liquid oil on the surface of the coconut fiber matrix. The liquid oil was decanted and weighed prior to being analyzed and deodorized. Gas chromatography was used to measure the flavor volatiles in the coconut oil before and after deodorization. The samples were analyzed using a continuous distillation/extraction concentration technique. Heptadecane was used as an internal standard.

The deodorized coconut oil was blended back to the coconut fiber matrix and gently mixed at about 100° F. for 1 hour in order to allow residual flavor compounds to partition into the deodorized oil. This process was repeated three times to effectively remove most of the coconut flavor. The following results were obtained.

| | Concentration (ng/g) | | |
|---|---|---|---|
| Flavor Component | Starting Material | After Two Centrifugations | After Three Centrifugations |
| Decane | 264.0 | 240.2 | 241.0 |
| Nonanal | 316.6 | 329.5 | 291.1 |
| Ethyl Octanoate | 254.8 | 156.5 | 101.6 |
| Dodecane | 346.7 | 236.1 | 147.2 |
| Delta Octalactone | 372.2 | 180.3 | 94.0 |
| 2-Undecanone | 193.2 | 162.4 | 170.8 |
| Ethyl Decanoate | 1076.6 | 659.2 | 393.6 |
| Tetradecane | 267.5 | 176.5 | 114.9 |
| 2-Tridecanone | 408.8 | 250.5 | 148.5 |
| Delta Decalactone | 3745.7 | 2791.3 | 1366.1 |
| Ethyl Dodecanoate | 2789.6 | 1796.3 | 1062.7 |
| Hexadecane | 126.4 | 123.4 | 73.0 |
| Delta Dodecalactone | 1220.5 | 973.0 | 541.4 |

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A method for preparing a deflavoring coconut concentrate, the method comprising:
   (1) separating oil from a coconut concentrate to provide a first coconut oil and a first coconut concentrate fibrous material;
   (2) deodorizing the coconut oil to form a first deodorized coconut oil;
   (3) blending the first deodorized coconut oil with the first coconut concentrate fibrous material to allow flavors in the first coconut concentrate fibrous material to partition into the deodorized coconut oil and to form a second deodorized coconut oil and a second coconut concentrate fibrous material;
   (4) repeating steps (2) and (3) on the second deodorized coconut oil and the second coconut concentrate fibrous material until sufficient flavor has been removed to form a final coconut oil and a final coconut concentrate fibrous material; and
   (5) blending the final coconut oil and the final coconut concentrate fibrous material to form the deflavored coconut concentrate.

2. The method of claim 1, wherein flavor component concentrations in the deflavored coconut concentrate have been reduced by at least about 25 percent, as compared to the coconut concentrate.

3. The method of claim 2, wherein the deflavored coconut concentrate has a protein concentration of at least about 6 percent with essentially none of the protein being denatured.

4. The method of claim 1, wherein the deflavored coconut concentrate has a protein concentration of at least about 6 percent with essentially none of the protein being denatured.

5. The method of claim 1, wherein the oil is separated from the coconut concentrate by centrifugation.

6. The method of claim 5, wherein the centrifugation is a high speed centrifugation process.

7. A deflavored coconut concentrate prepared by a process comprising:
   (1) separating oil from a coconut concentrate to provide a first coconut oil and a first coconut concentrate fibrous material;
   (2) deodorizing the coconut oil to form a first deodorized coconut oil;
   (3) blending the first deodorized coconut oil with the first coconut concentrate fibrous material to allow flavors in the first coconut concentrate fibrous material to partition into the deodorized coconut oil and to form a second deodorized coconut oil and a second coconut concentrate fibrous material;
   (4) repeating steps (2) and (3) on the second deodorized coconut oil and the second coconut concentrate fibrous material until sufficient flavor has been removed to form a final coconut oil and a final coconut concentrate fibrous material; and
   (5) blending the final coconut oil and the final coconut concentrate fibrous material to form the deflavored coconut concentrate.

8. The deflavored coconut concentrate of claim 7, wherein flavor component concentrations in the deflavored coconut concentrate have been reduced by at least about 25 percent, as compared to the coconut concentrate.

9. The deflavored coconut concentrate of claim 8, wherein the deflavored coconut concentrate has a protein concentration of at least about 6 percent with essentially none of the protein being denatured.

10. The deflavored coconut concentrate of claim 8, wherein the oil is separated from the coconut concentrate by centrifugation.

11. The deflavored coconut concentrate of claim 10, wherein the centrifugation is a high speed centrifugation process.

12. The deflavored coconut concentrate of claim 7, wherein the deflavored coconut concentrate has a protein concentration of at least about 6 percent with essentially none of the protein being denatured.

13. The deflavored coconut concentrate of claim 7, wherein the oil is separated from the coconut concentrate by centrifugation.

14. The deflavored coconut concentrate of claim 13, wherein the centrifugation is a high speed centrifugation process.

* * * * *